United States Patent
Dreher et al.

(10) Patent No.: US 6,489,381 B1
(45) Date of Patent: Dec. 3, 2002

(54) CEMENT COMPOSITIONS COMPRISING REDISPERSIBLE POLYMER POWDERS

(75) Inventors: Stefan Dreher, Neustadt (DE); Joachim Pakusch, Speyer (DE); Mario Sandor, Worms (DE); Bernd Reck, Grünstadt (DE); Claudia Wood, Weinheim (DE); Hans-Jürgen Denu, Friedelsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/639,952

(22) Filed: Aug. 17, 2000

(30) Foreign Application Priority Data

Sep. 4, 1999 (DE) .......................... 199 42 301

(51) Int. Cl.[7] .............................. C08K 3/00
(52) U.S. Cl. ............................................ 524/5
(58) Field of Search ............................. 524/5

(56) References Cited

U.S. PATENT DOCUMENTS 5,911,820 A * 6/1999 Satoh et al. .................. 524/5
6,048,916 A * 4/2000 Hirata et al. .................. 524/5

FOREIGN PATENT DOCUMENTS

| DE | 2 051 569 | 4/1972 |
|---|---|---|
| GB | 1 357 391 | 6/1974 |
| JP | 53-126093 | 11/1978 |
| JP | 8-217808 | 8/1996 |
| JP | 10-195312 | 7/1998 |

* cited by examiner

Primary Examiner—Peter Szekely
(74) Attorney, Agent, or Firm—Oblon, Spivak, McClelland, Maier & Neustadt, P.C.

(57) ABSTRACT

Cement-based compositions comprising per 100 parts by weight of cement from 1 to 500 parts by weight of a polymer built up from a) 30–99.5% by weight of at least one alkyl ester of (meth)acrylic acid, b) 0–70% by weight of at least one vinylaromatic, c) 0.5–10% by weight of at least one alkyl polyethoxy (meth)acrylate of the formula

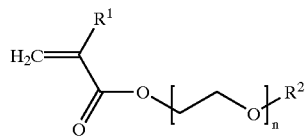

where $R^1$ is a hydrogen atom or a methyl group, $R^2$ is a $C_1$ to $C_4$ alkyl group and n is an integer from 1 to 55, d) 0–10% by weight of at least one ethylenically unsaturated mono- or dicarboxylic acid, such as acrylic acid, methacrylic acid, maleic acid, itaconic acid, or anhydride, amide or hydroxyalkylamide thereof, e) 0–10% by weight of acrylonitrile or methacrylonitrile, and f) 0–50% by weight of further ethylenically unsaturated compounds other than a) to e).

15 Claims, No Drawings

CEMENT COMPOSITIONS COMPRISING REDISPERSIBLE POLYMER POWDERS

The present specification relates to cement-based compositions comprising per 100 parts by weight of cement from 1 to 500 parts by weight of a polymer built up from a) 30–99.5% by weight of at least one alkyl ester of (meth)acrylic acid,
b) 0–70% by weight of at least one vinylaromatic,
c) 0.5–10% by weight of at least one alkyl polyethoxy (meth)-acrylate of the formula

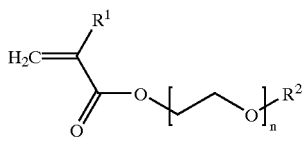

where $R^1$ is a hydrogen atom or a methyl group, $R^2$ is a $C_1$ to $C_4$ alkyl group and n is an integer from 1 to 55, d) 0–10% by weight of at least one ethylenically unsaturated mono- or dicarboxylic acid or anhydride, amide or hydroxyalkylamide thereof,
e) 0–10% by weight of acrylonitrile or methacrylonitrile, and
f) 0–50% by weight of further ethylenically unsaturated compounds other than a) to e).

The properties of hydraulic binders, especially cement, can be improved by adding synthetic polymers. The desire is to increase the flexibility of the binders resulting in improved crack bridging and, consequently, in improved freeze-thaw resistance. Further, polymer additives generally bring about reduced penetration of water and improved adhesion to different substrates.

Suitable polymers are those which are added to the cement in powder form and are present in aqueous dispersion after water has been added. The presence of cement, however, has a deleterious effect on the stability of the aqueous dispersion and results in the formation of coagulum. Therefore, the polymers are required to have very high electrolyte stability.

One possibility for increasing the electrolyte stability of polymer dispersions is copolymerization with surface-active monomers.

The use of polymer dispersions containing surface-active monomers in the polymer as an additive for cementitious materials is described in DE-A-2051569. Mention is made inter alia of esters of carboxylic acids with polyalkylene oxides.

JP-53126093 describes polymer dispersions which can contain ethoxylated (meth)acrylates. The degree of ethoxylation of the (meth)acrylate is from 4 to 30 and the end group on the ethylene oxide chain is a hydroxyl, methyl or alkylaryl group. Addition to cement is one of the uses referred to.

JP-10195312 likewise describes polymer dispersions which can contain hydroxyl-terminated, alkoxylated (meth) acrylates. The polymers are used as an additive for cement.

JP-08217808 describes polymer dispersions having multiphase latex particles, and mixtures thereof with cement. The shell of the latex particles consists of a copolymer containing from 0.05 to 70% of an ethoxylated (meth) acrylate. In the examples, polyethylene glycol monomethacrylate is used.

The use of the alkoxylated (meth)acrylic acid derivatives described above as comonomers results generally in adequate electrolyte stability of the polymers. A disadvantage in many cases, however, is the increased incidence of coagulum formation in the polymer dispersions. Increased coagulum formation makes it more difficult to filter and spray-dry the dispersions. A further disadvantage is an increase in viscosity which is associated with the use of alkoxylated (meth)acrylic acid derivatives and which often occurs after the polymers are added to the aqueous cement slurry. Finally, when relatively large amounts of alkoxylated (meth)acrylic acid derivatives are used, it is common to observe a severe reduction in the strength of the polymer-modified cement materials.

It is an object of the present invention to provide polymer-modified cement compositions in which the polymer has sufficient electrolyte stability. The polymer dispersion used as additive should have a very low coagulum fraction and should be readily convertible to powder form by spray drying. Further requirements are very good compatibility and processability with cement. The hardened polymer-cement formulations should combine high strength with adequate flexibility.

We have found that this object is achieved by the compositions defined above and their use.

The compositions of the invention contain per 100 parts by weight of cement from 1 to 500, preferably from 5 to 250, with particular preference from 10 to 150, parts by weight of the polymer defined in claim 1.

The polymer contains preferably at least 0.8% by weight, with particular preference at least 1% by weight, of the ethoxylated monomer of the formula I (monomer c). In general, the polymer contains not more than 8% by weight, with particular preference not more than 5% by weight and with very particular preference not more than 4% by weight of the monomer c), based on the polymer.

Preferably, the polymer has the following composition:
a) 40–99% by weight, with particular preference from 50 to 98% by weight, of at least one alkyl ester of (meth)acrylic acid,
b) 0–65% by weight, with particular preference from 0 to 60% by weight, of at least one vinylaromatic,
c) 0.8–8% by weight, with particular preference from 1 to 5% by weight, of at least one alkyl polyethoxy(meth) acrylate of the formula I,
d) 0.1–5% by weight, with particular preference from 0.3 to 4% by weight, of at least one ethylenically unsaturated mono- or dicarboxylic acid,
e) 0–8% by weight, with particular preference from 0 to 6% by weight, of acrylonitrile or methacrylonitrile, and
f) 0–40% by weight, with particular preference from 0 to 30% by weight, of further ethylenically unsaturated compounds other than a) to e).

The alkyl esters of (meth)acrylic acid (monomers a) are preferably $C_1$ to $C_{18}$, with particular preference $C_1$ to $C_8$, alkyl (meth)acrylates, examples being methyl (meth) acrylate, ethyl (meth)acrylate, n-butyl (meth)acrylate, isobutyl (meth)acrylate, tert-butyl (meth)acrylate and 2-ethylhexyl (meth)acrylate. Particular preference is given to methyl methacrylate, n-butyl acrylate, ethyl acrylate and 2-ethylhexyl acrylate.

The vinylaromatics (b) are especially α-methylstyrene and styrene.

Preferred alkyl polyethoxy(meth)acrylates of the formula (I) (monomers c) are those in which $R^2$ is methyl and n is an integer from 5 to 50, with particular preference from 5 to 30.

Suitable ethylenically unsaturated mono- or dicarboxylic acids, anhydrides or amides (d) are, for example, acrylic acid, methacrylic acid, maleic acid, itaconic acid, their amides such as acrylamide or methacrylamide or their hydroxyalkylamides such as methylol(meth)acrylamide. Acrylic acid and methacrylic acid are particularly preferred.

Examples of further monomers (f) are crosslinking monomers, such as divinylbenzene, α-ethylstyrene, butanediol diacrylate, ethyldiglycol diacrylate, hexanediol diacrylate, ureidoethyl methacrylate, ureidoethyl methacrylamide, allyl methacrylate, 3-methacryloyloxypropyltrimethoxysilane, acetoacetoxyethyl methacrylate, diacetoneacrylamide, acrylamidoglycolic acid or methyl acrylamidoglycolate methyl ether. The proportion of crosslinking monomers, if used, is generally below 5% by weight.

The glass transition temperature of the polymer is preferably from −60 to 50° C., in particular from −60 to +30° C., with particular preference from −30 to +40° C.

The glass transition temperature of the polymer can be determined in accordance with customary methods such as differential thermal analysis or differential scanning calorimetry (cf., e.g., ASTM 3418/82, midpoint temperature).

The polymer is prepared preferably by emulsion polymerization and is therefore an emulsion polymer.

Alternatively, it can be prepared, for example, by solution polymerization with subsequent dispersion in water.

In the case of the emulsion polymerization, ionic and/or nonionic emulsifiers and/or protective colloids, and/or stabilizers, are used as surface-active compounds.

A detailed description of suitable protective colloids is given in Houben-Weyl, Methoden der organischen Chemie, Volume XIV/1, Makromolekulare Stoffe [Macromolecular Substances], Georg-Thieme-Verlag, Stuttgart, 1961, pp. 411 to 420. Suitable emulsifiers include anionic, cationic and nonionic emulsifiers. Accompanying surface-active substances used are preferably exclusively emulsifiers, whose molecular weights, unlike those of the protective colloids, are usually below 2000 g/mol. Where mixtures of surface-active substances are used, the individual components must of course be compatible with one another, which in case of doubt can be checked by means of a few preliminary experiments. It is preferred to use anionic and nonionic emulsifiers as surface-active substances. Customary accompanying emulsifiers are, for example, ethoxylated fatty alcohols (EO units: 3 to 50, alkyl: $C_8$ to $C_{36}$), ethoxylated mono-, di- and trialkylphenols (EO units: 3 to 50, alkyl: $C_4$ to $C_9$), alkali metal salts of dialkyl esters of sulfosuccinic acid, and also alkali metal salts and ammonium salts of alkyl sulfates (alkyl: $C_8$ to $C_{12}$), of ethoxylated alkanols (EO units: 4 to 30, alkyl: $C_{12}$ to $C_{18}$), of ethoxylated alkylphenols (EO units: 3 to 50, alkyl: $C_4$ to $C_9$), of alkylsulfonic acids (alkyl: $C_{12}$ to $C_{18}$) and of alkylarylsulfonic acids (alkyl: $C_9$ to $C_{18}$).

Further suitable emulsifiers are compounds of the formula II

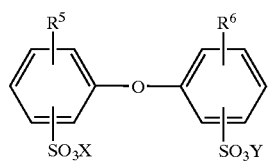

(II)

in which $R^5$ and $R^6$ are hydrogen or $C_4$ to $C_{14}$ alkyl but are not both hydrogen and C and Y can be alkali metal and/or ammonium ions. $R^5$ and $R^6$ are preferably linear or branched alkyl radicals of 6 to 18 carbon atoms or hydrogen and in particular have 6, 12 or 16 carbon atoms but are not both hydrogen. X and Y are preferably sodium, potassium or ammonium ions, particular preference being given to sodium. Particularly advantageous compounds II are those in which X and Y are sodium, $R^5$ is a branched alkyl radical of 12 carbon atoms and $R^6$ is hydrogen or $R^5$. It is common to use technical-grade mixtures containing from 50 to 90% by weight of the monoalkylated product, an example being Dowfax® 2A1 (trademark of Dow Chemical Company).

Suitable emulsifiers are also given in Houben-Weyl, loc.cit., Volume 14/1, pages 192 to 208.

Trade names of emulsifiers include, for example, Dowfax®2 A1, Emulan® NP 50, Dextrol® OC 50, Emulgator 825, Emulgator 825 S, Emulan® OG, Texapon®NSO, Nekanil® 904 S, Lumiten® I-RA, Lumiten E 3065, Disponil FES 77, Lutensol AT 18, Steinapol VSL and Emulphor NPS 25.

The surface-active substance is preferably an alkoxylated, preferably ethoxylated and/or propoxylated, emulsifier or protective colloid. Particular preference is given to an alkoxylated emulsifier. Low molecular mass anionic or nonionic alkoxylated emulsifiers that may be mentioned include for example alkylphenylpolyethoxysulfonates or alkylphenyl polyethoxysulfates, alkyl or alkenyl polyethoxysulfates or alkyl- or alkenylpolyethoxysulfonates, alkylglycerylpolyethoxysulfonates, ethoxylated sulfosuccinic mono- and diesters, alkyl, alkenyl or dialkyl polyethoxyphosphates, ethoxylated singly and multiply ring-sulfonated mono- or dialkylalkyl biphenylyl ethers, ethoxylated α-sulfo fatty esters, ethoxylated fatty acid monoglycerides or fatty acid alkanolamine sulfates, ethoxylated fatty acid esters or fatty acid sarcosides, glycolates, lactates, taurides and isethionates, alkylphenyl polyethoxylates or propoxylates, alkyl or alkenyl ethoxylates or propoxylates, polyalkylene oxide adducts such as ethylene oxide-propylene oxide block copolymers, fatty acid alkylolamidoethoxylates, and ethoxylated fatty acids, fatty amines, fatty acid amides or alkanesulfonamides.

Particular preference is given to alkylphenylpolyethoxysulfonates or -sulfates, alkyl or alkenylpolyethoxysulfonates or -sulfates, alkylphenylpolyethoxylates or -propoxylates, and polyalkylene oxide adducts such as, for example, ethylene oxide-propylene oxide block copolymers.

The surface-active substance is usually used in amounts of from 0.1 to 20 parts by weight, preferably from 0.5 to 10 parts by weight, per 100 parts by weight of monomer to be polymerized.

The resulting polymer dispersion and also the polymer powder obtained in the case of subsequent drying, e.g., spray drying, therefore contain a corresponding amount of the surface-active substance.

Examples of water-soluble initiators for the emulsion polymerization are ammonium salts and alkali metal salts of peroxodisulfuric acid, an example being sodium peroxodisulfate, hydrogen peroxide, or organic peroxides, an example being tert-butyl hydroperoxide, or water-soluble azo compounds.

Reduction-oxidation (redox) initiator systems are particularly suitable.

The redox initiator systems consist of at least one, usually inorganic, reducing agent and one organic or inorganic oxidizing agent.

The oxidizing components comprise, for example, the abovementioned initiators for the emulsion polymerization.

The reduction components comprise, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems can be used together with soluble metal compounds whose metallic component is able to exist in a plurality of valence states.

Examples of common redox initiator systems are ascorbic acid/iron(II) sulfate/sodium peroxodisulfate, tert-butyl hydroperoxide/sodium disulfite, tert-butyl hydroperoxide/sodium hydroxymethanesulfinate. The individual components—the reduction component, for example—can also be mixtures, an example being a mixture of the sodium salt of hydroxymethanesulfinic acid and sodium disulfite.

Said compounds are usually in the form of aqueous solutions, the minimum concentration being determined by the amount of water acceptable in the dispersion and the maximum concentration by the solubility in water of the compound in question. In general, the concentration is from 0.1 to 30% by weight, preferably from 0.5 to 20% by weight, with particular preference from 1.0 to 10% by weight, based on the solution.

The amount of initiators is generally from 0.1 to 10% by weight, preferably from 0.5 to 5% by weight, based on the monomers to be polymerized. It is also possible to use a plurality of different initiators for the emulsion polymerization.

In the course of the polymerization it is possible to use regulators in amounts, for example, of from 0 to 0.8 part by weight per 100 parts by weight of the monomers to be polymerized, the function of these regulators being to reduce the molecular mass. Suitable examples include compounds having a thiol group, such as tert-butyl mercaptan, ethylhexyl thioglycolate, mercaptoethanol, mercaptopropyltrimethoxysilane, and tert-dodecyl mercaptan.

The emulsion polymerization takes place in general at from 30 to 130° C., preferably from 50 to 95° C. The polymerization medium can consist either of water alone or of mixtures of water with water-miscible liquids such as methanol. Preference is given to the use of water alone. The emulsion polymerization can be conducted either as a batch process or in the form of a feed process, including stage or gradient procedures. Preference is given to the feed process, in which a portion of the polymerization mixture is introduced as an initial charge, heated to the polymerization temperature and partly polymerized and then the remainder of the polymerization mixture is supplied to the polymerization zone continuously, in stages or under a concentration gradient while the polymerization is maintained, said supply usually taking place by way of two or more physically separate feed streams of which one or more contain the monomers in pure or in emulsified form. In order, for example, to better establish the particle size, it is also possible to include seed polymer in the initial charge for the polymerization.

Thus it can be particularly advantageous to meter in the ethoxylated (meth)acrylic acid derivative not right at the beginning but only during the course of the emulsion polymerization.

The manner in which the initiator is added to the polymerization vessel in the course of the free-radical aqueous emulsion polymerization is familiar to the skilled worker. It can either be included in its entirety in the initial charge to the polymerization vessel or else introduced continuously or in stages at the rate at which it is consumed in the course of the free-radical aqueous polymerization. This will depend specifically on the chemical nature of the initiator system and on the polymerization temperature. Preferably, one portion is included in the initial charge and the remainder is supplied to the polymerization zone at the rate at which it is consumed.

In order to remove the residual monomers, it is common to add initiator after the end of the actual emulsion polymerization as well, i.e., after a monomer conversion of at least 95%.

In the case of the feed process, the individual components can be added to the reactor from above, through the side or from below, through the reactor floor.

In the case of emulsion polymerization, aqueous dispersions of the polymer are obtained which have solids contents of in general from 15 to 75% by weight, preferably from 40 to 75% by weight.

In order to achieve a high space-time yield of the reactor, dispersions having a very high solids content are preferred. In order to be able to achieve solid contents>60% by weight, a bimodal or polymodal particle size should be established, since otherwise the viscosity becomes too high and the dispersion can no longer be handled. The formation of a new particle generation can be carried out, for example, by adding seed (EP 81083), by adding excess amounts of emulsifier, or by adding miniemulsions. A further advantage associated with the low viscosity and high solids content is the improved coating behavior at high solids contents. The production of a new particle generation or generations can take place at any desired point in time. It depends on the particle size distribution desired for a low viscosity.

The polymer is admixed preferably in the form of powder with the cement.

The polymer powder is preferably dispersible in water (where the polymer is prepared by emulsion polymerization, this is also called redispersibility in water).

Following the emulsion polymerization, the polymer is in the form of an aqueous dispersion of polymer particles.

The average size of the particles is preferably from 50 to 500 nm, with particular preference from 80 to 300 nm. The viscosity of the polymer dispersions is preferably within a range from 1 to 1000 mPas, preferably from 10 to 400 mPas (at a solids content of 40% by weight), as measured with a rotational viscometer in accordance with DIN 53019 at 23° C. and a shear rate of 250 s$^{-1}$.

The redispersible polymer powders can be obtained from aqueous polymer dispersions by drying processes, especially spray drying.

For spray drying it is also possible to add drying assistants to the aqueous polymer dispersion, examples being polyvinyl acetate hydrolysates or formaldehyde-naphthalenesulfonic acid condensates.

The spray drying usually takes place in a drying tower.

In general, the spray drying of the aqueous polymer dispersion is conducted at an air stream inlet temperature $T_I$, of from 100 to 200° C., preferably 120 to 160° C., and an air stream outlet temperature $T_O$ of from 30 to 90° C., preferably from 50 to 90° C. The spraying of the aqueous polymer dispersion in the hot air stream can be carried out, for example, by means of single-fluid or multi-fluid nozzles or via a rotating disk. The polymer powders are normally collected using cyclones or filter separators. The spray-dispensed aqueous polymer dispersion and the hot air stream are preferably guided in parallel. Frequently, a finely divided mineral antiblocking agent (e.g. finely divided silica gel) is metered into the tower during the spray drying operation, especially to suppress any clumping together of the spray-dried secondary polymer particles during prolonged storage of the polymer powder that results in accordance with the invention.

The water-dispersible or water-redispersible polymer can be mixed with cement in the abovementioned amounts at any time, i.e. immediately or not until shortly before use.

The cement involved can be blast furnace cement, oil shale cement, Portland cement, hydrophobicized Portland cement, quicksetting cement, high expansion cement or high alumina cement, although the use of Portland cement has proven particularly advantageous.

Further constituents which may also be present in the compositions of the invention besides cement and polymer dispersion include optional constituents such as, for example, mineral aggregates, such as sand, gravel, silica, microsilica, lime, chalk, gypsum, loam, clay and also defoamers, plasticizers, flow aids and setting retardants or setting accelerators.

Normally, the composition of the invention is mixed with water and then processed.

The compositions are suitable, for example, as repair mortars or reinforcing mortars, and also as tile adhesives, sealants, coating compositions or fillers.

The cement compositions of the invention are notable for the high electrolyte stability of the polymer in the presence of cement. The polymer dispersion as such contains virtually no coagulum and can easily be converted to powder form, e.g., spray-dried.

In aqueous cement compositions, the polymer dispersions exhibit good miscibility and thus result in effective processing. Homogeneous cement slurries are obtained which show no sedimentation ("bleeding") and exhibit little tool tack. The processing period ("open time") of the aqueous cement compositions is sufficient. In the case of customary formulations it is more than 15 minutes, generally more than 30 minutes.

In the hardened cementitious masses, the addition of the polymer results in great flexibilization of the material and increased adhesion to mineral substrates. Polymer-rich compositions containing more than 20% by weight polymer based on the mineral components result in highly flexible, water-resistant films of high cohesion.

EXAMPLES

1. Preparation of the Polymer Dispersions of the Invention

In the text below, the preparation of polymer dispersions of the invention and polymer-modified cement slurries is described in the form of a number of inventive and comparative examples.

The nonvolatile fractions (solids content) were determined in a circulating-air drying oven from the weight loss of a 1 g sample dried at 120° C. for two hours. The viscosity of the samples was determined using a rotational viscometer (Rheomat) from Paar Physica at a shear rate of 250 $s^{-1}$ in accordance with DIN 53019 at 23° C. The pH was measured using a commercially customary combination electrode (Schott Handylab 1).

Inventive Example 1

A 2 l glass vessel with anchor stirrer (120 rpm) was charged with 230 g of deionized water and 5.5 g of Lutensol AT 18. At an internal temperature of 85° C., 5% by weight of the total amount of a feed stream 1 and 10% by weight of a total amount of a feed stream 2 were added. The reaction mixture was partly polymerized at 85° C. for 10 minutes. Then, at 85° C., the remainder of feed streams 1 and 2, physically separated, were supplied continuously over the course of 3.5 h. After a postpolymerization of 30 minutes, the batch was cooled and neutralized with dilute aqueous Ca(OH)$_2$ solution. The resulting polymer dispersion contains 50.2% of nonvolatile fractions and has a pH of 7.2. The viscosity is 54 mpas. The copolymer present has a glass transition temperature of −25° C.

Feed Stream 1:
- 136 g of deionized water
- 36.7 g of Disponil FES 77 (30% strength by weight aqueous solution of an alkyl polyethoxysulfate, from Henkel)
- 27.5 g of Lutensol AT 18 (a 20% strength aqueous solution of an ethoxylated fatty alcohol, (from BASF))
- 385 g of 2-ethylhexyl acrylate
- 165 g of styrene
- 11.0 g of Bisomer MPEG350MA (methyl polyglycol methacrylate from INSPEC having an average degree of ethoxylation of 8)
- 5.5 g of methacrylic acid Feed Stream 2:
- 100 g of deionized water
- 3.3 g of sodium peroxodisulfate

Inventive Example 2

A 2 l glass vessel with anchor stirrer (120 rpm) was charged with 230 g of deionized water and 5.5 g of Lutensol AT 18. At an internal temperature of 85° C., 5% by weight of the total amount of a feed stream 1 and 10% by weight of a total amount of a feed stream 2 were added. The reaction mixture was partly polymerized at 85° C. for 10 minutes. Then, at 85° C., the remainder of feed streams 1 and 2, physically separated, were supplied continuously over the course of 3.5 h. After a postpolymerization of 30 minutes, the batch was cooled and neutralized with dilute aqueous Ca(OH)$_2$ solution. The resulting polymer dispersion contains 49.7% of nonvolatile fractions and has a pH of 7.0. The viscosity is 39 mPas. The copolymer present has a glass transition temperature of +24° C.

Feed Stream 1:
- 138 g of deionized water
- 18.3 g of Disponil FES 77
- 8.3 g of Lutensol AT 18
- 275 g of n-butyl acrylate
- 275 g of styrene
- 11.1 g of Bisomer S 10 W (methyl polyglycol methacrylate from INSPEC having an average degree of ethoxylation of 20)
- 5.5 g of methacrylic acid Feed Stream 2:
- 80 g of deionized water
- 3.3 g of sodium peroxodisulfate

Inventive Example 3

A 2 l glass vessel with anchor stirrer (120 rpm) was charged with 230 g of deionized water and 5.5 g of Lutensol AT 18. At an internal temperature of 85° C., 5% by weight of the total amount of a feed stream 1 and 10% by weight of a total amount of a feed stream 2 were added. The reaction mixture was partly polymerized at 85° C. for 10 minutes. Then, at 85° C., the remainder of feed streams 1 and 2, physically separated, were supplied continuously over the course of 3.5 h. After a postpolymerization of 30 minutes, the batch was cooled and neutralized with dilute aqueous Ca(OH)$_2$ solution. The resulting polymer dispersion contains 49.5% of nonvolatile fractions and has a pH of 7.3. The viscosity is 38 mPas. The copolymer present has a glass transition temperature of −33° C.

Feed Stream 1:
- 138 g of deionized water
- 18.3 g of Disponil FES 77
- 8.3 g of Lutensol AT 18
- 468 g of n-butyl acrylate
- 55 g of ethyl acrylate
- 26 g of acrylonitrile
- 22.0 g of Bisomer S 20 W (50% strength by weight aqueous solution of a methyl polyglycol methacrylate from INSPEC having an average degree of ethoxylation of 45)
- 5.5 g of methacrylic acid Feed Stream 2:
- 80 g of deionized water
- 3.3 g of sodium peroxodisulfate Inventive Example 4

A 2 l glass vessel with anchor stirrer (120 rpm) was charged with 230 g of deionized water and 6 g of Emulgator 825, a 20% strength by weight aqueous solution of an ethoxylated octylphenol (from BASF). At an internal temperature of 85° C., 5% by weight of the total amount of a feed stream 1 and 10% by weight of a total amount of a feed stream 2 were added. The reaction mixture was partly polymerized at 85° C. for 10 minutes. Then, at 85° C., the remainder of feed streams 1 and 2, physically separated, were supplied continuously over the course of 3.5 h. After a postpolymerization of 30 minutes, the batch was cooled and neutralized with dilute aqueous NH$_3$ solution. The resulting polymer dispersion contains 50.2% of nonvolatile fractions and has a pH of 7.0. The viscosity is 34 mpas. The copolymer present has a glass transition temperature of +12° C.

Feed Stream 1:
- 130 g of deionized water
- 22.5 g of Emulphor NPS 25 (35% strength by weight aqueous solution of a nonylphenol polyethoxysulfate, from BASF)
- 10.0 g of Emulgator 825
- 385 g of n-butyl acrylate
- 155 g of methyl methacrylate
- 11.0 g of acrylonitrile
- 11.0 g of Bisomer MPEG350MA Feed Stream 2:
- 80 g of deionized water
- 3.3 g of sodium peroxodisulfate Comparative Example C-1 (Ethoxylated Methacrylate with Free OH Group)

This polymer dispersion was prepared as for Inventive Example 1 but using the feed streams 1 and 2 below. The resulting polymer dispersion contains 49.9% of nonvolatile fractions and has a pH of 7.3. The viscosity is 45 mPas. The copolymer present has a glass transition temperature of −22° C.

Feed Stream 1:
- 136 g of deionized water
- 36.7 g of Disponil FES 77
- 27.5 g of Lutensol AT 18
- 385 g of 2-ethylhexyl acrylate
- 165 g of styrene
- 11.0 g of Bisomer PEM 6 E (polyglycol methacrylate from INSPEC having an average degree of ethoxylation of 6)
- 5.5 g of methacrylic acid Feed Stream 2:
- 100 g of deionized water
- 3.3 g of sodium peroxodisulfate Comparative Example C-2 (Ethoxylated Methacrylate with Long Alkyl Group)

This polymer dispersion was prepared as for Inventive Example 1 but using the feed streams 1 and 2 below. The resulting polymer dispersion contains 49.5% of nonvolatile fractions and has a pH of 7.0. The viscosity is 45 mPas. The copolymer present has a glass transition temperature of −24° C.

Feed Stream 1:
- 136 g of deionized water
- 36.7 g of Disponil FES
- 27.5 g of Lutensol AT 18
- 385 g of 2-ethylhexyl acrylate
- 165 g of styrene
- 11.0 g a $C_{16}$–$C_{18}$ fatty alcohol polyethoxymethacrylate having an average degree of ethoxylation of 25)
- 5.5 g of methacrylic acid Feed Stream 2:
- 100 g of deionized water
- 3.3 g of sodium peroxodisulfate Comparative Example C-3 (Without Ethoxylated Methacrylate)

This polymer dispersion was prepared as for Inventive Example 1 but using the feed streams 1 and 2 below. The resulting polymer dispersion contains 49.8% of nonvolatile fractions and has a pH of 7.2. The viscosity is 38 mPas. The copolymer present has a glass transition temperature of −20° C.

Feed Stream 1:
- 136 g of deionized water
- 37.0 g of Disponil FES 77
- 27.5 g of Lutensol AT 18
- 392 g of 2-ethylhexyl acrylate
- 168 g of styrene
- 6.0 g of methacrylic acid Feed Stream 2:
- 100 g of deionized water
- 3.3 g of sodium peroxodisulfate Table 1 lists the monomer composition and glass transition temperature for each of the inventive and comparative examples. Also given is the number of EO units and the nature of the end group of the ethoxylated methacrylic acid derivative used in each case.

TABLE 1

Monomer composition and glass transition temperature (Tg) of the examples

| Sample | Monomers | EO units | End group | Tg [° C.] |
|---|---|---|---|---|
| 1 | 70 EHA<br>30 S<br>2 EO monomer[1]<br>1 MAA | 8 | methyl | −25 |
| 2 | 50 nBA<br>50 styrene<br>2 EO monomer[2]<br>1 MAA | 20 | methyl | +24 |
| 3 | 85 nBA<br>10 EA<br>5 acrylonitrile<br>2 EO monomer[3]<br>1 MAA | 45 | methyl | +21 |
| 4 | 70 nBA<br>28 MA<br>2 acrylonitrile<br>2 EO monomer[2] | 8 | methyl | −33 |
| C-1 | 70 EHA<br>30 S<br>2 EO monomer[4]<br>1 MAA | 6 | hydroxyl | −22 |
| C-2 | 70 EHA<br>30 S<br>2 EO monomer[5]<br>1 MAA | 25 | $C_{16}$–$C_{18}$-alkyl | −24 |
| C-3 | 70 EHA<br>30 S<br>1 MAA | ± | ± | −20 |

EO monomer[1] = Bisomer MPEG 350 MA
EO monomer[2] = Bisomer S 10 W
EO monomer[3] = Bisomer S 20 W
EO monomer[4] = Bisomer PEM 6 E
EO monomer[5] = $C_{16}$–$C_{18}$ fatty alcohol polyethoxymethacrylate (EO ≈ 25)

2. Stability of the Polymer Dispersions of the Invention

The choice of nature and amount of the ethoxylated methacrylic acid derivative has a critical influence on the stability of the polymer dispersions. Parameters given for the colloidal stability in Table 2 are the coagulum content and gel speck content and also the electrolyte stability of the inventive and comparative examples. The coagulum content was determined by filtering the dispersion through a Perlon sieve having an average mesh size of 45 μm. The proportion of fine coagulum (gel specks) was determined by drawing down a 200 μm film of the filtered (45 μm) polymer dispersions onto a glass plate, drying the film completely and then investigating it for included particles of fine coagulum. The result was evaluated using ratings from very good (no fine coagulum) to very poor (a large amount of fine coagulum). The electrolyte stability is determined by adding a few drops of dispersion to $CaCl_2$ solutions of varying concentrations ranging in 0.5% by weight steps from 0.5 to 5% by weight. Table 2 indicates the $CaCl_2$ concentration at which the respective dispersion is still stable. At higher concentrations, coagulation occurs.

TABLE 2

Coagulum and gel speck content, and electrolyte stability of the examples

| | EO monomer | | Coagulum | Colloidal stability | |
|---|---|---|---|---|---|
| | | | | Gel speck | Electrolyte |
| Sample | EO units | End group | [% by wt.] | content [rating] | stability [% by wt. $CaCl_2$] |
| 1 | 8 | methyl | 0.03 | good | 2 |
| 2 | 20 | methyl | 0.01 | very good | 3 |
| 3 | 45 | methyl | 0.05 | good | 3 |
| 4 | 8 | methyl | 0.03 | good | 2 |
| C-1 | 6 | hydroxyl | 0.03 | good | 2 |
| C-2 | 25 | $C_{16}$–$C_{18}$-alkyl | 0.38 | satisfactory | 0.5 |
| C-3 | ± | ± | 0.27 | poor | <0.5 |

The results listed in Table 2 make it clear that the polymer dispersions of the invention are highly stable. The proportion of coagulum, and of fine coagulum, is low, the electrolyte stability (stability in the presence of electrolytes such as cement) high. The use of an ethoxylated methacrylic acid derivative without a terminal alkyl group results in comparable stabilities. If, however, the comonomer used is not ethoxylated, or has a long terminal alkyl group, the resulting polymer dispersions contain a much higher proportion of coagulum, and fine coagulum, and the electrolyte stability is lower.

3. Spray Drying of the Polymer Dispersions of the Invention

The polymer dispersions from Examples 1, C-1, C-2 and C-3 were spray-dried in a pilot plant dryer. The spraying aid added to the latices in each case was 10% by weight (based on polymer solids) of Tamol SC 9422 (naphthalenesulfonic acid-formaldehyde condensate from BASF), the flow aid used was Sipernat D 17 (from Degussa). The solids content of the spray feed was 30% by weight. Atomization took place through a two-fluid Teflon nozzle (nozzle width 1.3 mm), the inlet temperature was 130° C., the outlet temperature 60° C.

Table 3 shows the results of spray drying. Evidently, the samples of Comparative Examples C-2 and C-3 cannot be spray dried. Owing to the high level of fine coagulum in these 1 latices, the two-fluid nozzle became clogged even after filtration to 45 μm. Therefore, it was impossible to obtain powders. The polymer dispersion of the invention from Example 1, on the other hand, could be spray dried without problems at high yield. The resulting powder is readily dispersible.

TABLE 3

Monomer composition and spray drying result of the examples

| Sample | EO monomer [% by wt.] | EO units | End group | Yield [% by wt.] | Remarks |
|---|---|---|---|---|---|
| 1 | 2 | 8 | methyl | 71 | can be dried without problems |
| C-1 | 2 | 6 | hydroxyl | 68 | can be dried without problems |
| C-2 | 2 | 25 | $C_{16}$–$C_{18}$-alkyl | ± | nozzle becomes clogged |
| C-3 | ± | ± | ± | ± | nozzle becomes clogged |

4. Use of the Polymer Dispersions in Cementitious Building Material

The influence of the polymer dispersions of the invention on the processability and mechanical properties of cementitious building materials was assessed by preparing aqueous polymer cement slurries in accordance with the formulation given in Table 4. The compositions correspond to a weight-based polymer:cement ratio of 0.6. Deionized water was added to bring the slurries to a uniform consistency. The water:cement ratio was approximately 0.8. A coating bar was used to produce films having a thickness of 2 mm (dry) from the slurry. The films were dried for 28 days under standard climatic conditions (23° C.; 50% relative atmospheric humidity).

TABLE 4

Composition of the polymer cement slurries

| | |
|---|---|
| quartz sand (0–0.09 mm) | 20.5 g |
| quartz sand (0.08–0.2 mm) | 22.5 g |
| quartz sand (0.2–0.5 mm) | 30.0 g |
| cement CEM I 42.5 R | 25.0 g |
| Lumiten E (defoamer; from BASF) | 2.0 g |
| polymer (solid) | 15.0 g |

The processability of the aqueous polymer cement slurries was assessed using ratings from very good to very poor. Parameters considered were the homogeneity of the slurries, any sedimentation of the mineral constituents ("bleeding"), the tool tack, and the roughness of the surface of the resulting film (bubbles, microcracks). The open time of the polymer cement slurries is the time during which, after the components have been combined, the material remains plastically deformable without forming cracks or solid particles. The tensile strength and elongation at break of the polymer cement films are measured in accordance with DIN 53455 on an automatic material testing instrument at a pulling speed of 100 mm/min.

TABLE 5

Performance properties of the examples

| Sample | Process-ability [Rating] | Open time [min] | Tensile strength [N/mm$^2$] | Elongation at break [%] | Remarks |
|---|---|---|---|---|---|
| 1 | very good | >30 | 0.7 | 52 | homogeneous film |
| 3 | very good | >30 | 1.2 | 30 | homogeneous film |
| C-1 | poor | <10 | ± | ± | no cohesive film |
| C-2 | satisfactory | 10–20 | 0.4 | 28 | ± |
| C-3 | poor | <5 | ± | ± | no cohesive film |

The polymer dispersions evidently result in polymer cement slurries which are readily processable and have a (desired) long open time. The resulting polymer cement films are homogeneous in structure and exhibit a balanced proportion of strength (tensile strength) and flexibility (elongation at break). The sample C-1, containing an ethoxylated methacrylic acid derivative without a terminal alkyl group, on the other hand, exhibits very poor processing. The slurry requires a large amount of water for formulation to a processible consistency and starts to thicken very rapidly, giving it a relatively short open time. In addition, the slurry has a tendency to undergo phase separation; i.e., the mineral constituents undergo sedimentation. Consequently, the polymer cement film obtained with this sample has a highly irregular surface with many cracks and bubbles; it was impossible to measure mechanical values owing to excessively low cohesion. The sample C-3 without ethoxylated comonomer exhibits comparatively poor properties. The sample C-2, containing an ethoxylated methacrylic acid derivative having a long terminal alkyl group, exhibits moderate processability in the slurry. Relative to the samples of the invention, the polymer cement films obtained show a comparable flexibility but a reduced strength (tensile strength).

We claim:

1. A cement-based composition consisting essentially of, per 100 parts by weight of cement, from 5 to 500 parts by weight of a polymer formed from a) 30–99.5% by weight of at least one alkyl ester of (meth)acrylic acid, b) 0.5–10% by weight of at least one alkyl polyethoxy (meth)acrylate of formula 1:

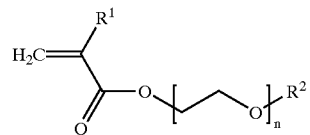

where $R^1$ is a hydrogen atom or a methyl group, $R^2$ is a $C_1$ to $C_4$ alkyl group and n is an integer from 1 to 55, c) 0–10% by weight of at least one ethylenically unsaturated mono- or dicarboxylic acid or anhydride, amide or hydroxyalkylamide thereof, d) 0–10% by weight of acrylonitrile or methacrylonitrile, and e) 0–50% by weight of further ethylenically unsaturated compounds selected from the group consisting of divinylbenzene, butanediol diacrylate, ethyldiglycol diacrylate, hexanediol diacrylate, ureidoethyl methacrylate, ureidoethyl methacrylamide, allyl methacrylate, 3-methacryloyloxypropyltrimethoxysilane, acetoacetoxyethyl methacrylate, diacetoneacrylamide, acrylamidoglycolic acid and methyl acrylamidoglycolate methyl ether.

2. The composition as claimed in claim 1, wherein $R^2$ in formula 1 is methyl and n is an integer from 5 to 50.

3. The composition as claimed in claim 1, wherein said polymer is an emulsion polymer.

4. The composition as claimed in claim 1, containing per 100 parts by weight of said polymer, from 01.0 to 20 parts by weight of an alkoxylated emulsifier.

5. The composition as claimed in claim 1, wherein the glass transition temperature (Tg) of said polymer is from −60 to +30° C.

6. The composition as claimed in claim 1, wherein said polymer is in the form of a powder.

7. The composition as claimed in claim 1, wherein said composition is in the form of a water-dispersible or water-redispersible powder.

8. A repair mortar, reinforcing mortar, tile adhesive, sealant, coating composition or filler containing a cement-based composition consisting essentially of, per 100 parts by weight of cement, from 5 to 500 parts by weight of a polymer formed from a) 30–99.5% by weight of at least one alkyl ester of (meth)acrylic acid, b) 0.5–10% by weight of at least one alkyl polyethoxy (meth)acrylate of formula 1:

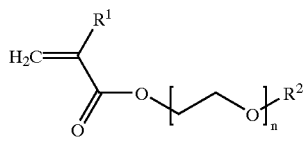

where $R^1$ is a hydrogen atom or a methyl group, $R^2$ is a $C_1$ to $C_4$ alkyl group and n is an integer from 1 to 55, c) 0–10% by weight of at least one ethylenically unsaturated mono- or dicarboxylic acid or anhydride, amide or hydroxyalkylamide thereof, d) 0–10% by weight of acrylonitrile or methacrylonitrile, and e) 0–50% by weight of further ethylenically unsaturated compounds selected from the group consisting of divinylbenzene, butanediol diacrylate, ethyldiglycol diacrylate, hexanediol diacrylate, ureidoethyl methacrylate, ureidoethyl methacrylamide, allyl methacrylate, 3-methacryloyloxypropyltrimethoxysilane, acetoacetoxyethyl methacrylate, diacetoneacrylamide, acrylamidoglycolic acid and methyl acrylamidoglycolate methyl ether.

9. The composition as claimed in claim 1, wherein said polymer is present in an amount of from 10 to 150 parts by weight per 100 parts by weight of said cement.

10. The composition as claimed in claim 1, wherein said at least one alkyl polyethoxy(meth)acrylate is present in said polymer in an amount of 1–4% by weight.

11. The composition as claimed in claim 1, wherein said at least one alkyl ester of (meth)acrylic acid is methyl (meth)acrylate, ethyl (meth)acrylate, n-butyl (meth)acrylate, isobutyl (meth)acrylate, tert-butyl (meth)acrylate or 2-ethylhexyl (meth)acrylate.

12. The composition as claimed in claim 1, wherein $R^2$ in formula 1 is methyl and n is an integer from 5–30.

13. The composition as claimed in claim 1, wherein the glass transition temperature (Tg) of said polymer is from −30 to +40° C.

14. The composition as claimed in claim 1, wherein said polymer has the following composition:
a) 40–99% by weight of at least one alkyl ester of (meth)acrylic acid,
b) 0.8–8% by weight of at least one alkyl polyethoxy (meth)acrylate of formula 1,
c) 0.1–5% by weight of at least one ethylenically unsaturated mono- or dicarboxylic acid,
d) 0–8% by weight of acrylonitrile or methacrylonitrile, and
e) 0–40% by weight of further ethylenically unsaturated compounds selected from the group consisting of divinylbenzene, butanediol diacrylate, ethyldiglycol diacrylate, hexanediol diacrylate, ureidoethyl methacrylate, ureidoethyl methacrylamide, allyl methacrylate, 3-methacryloyloxypropyltrimethoxysilane, acetoacetoxyethyl methacrylate, diacetoneacrylamide, acrylamidoglycolic acid and methyl acrylamidoglycolate methyl ether.

15. The composition as claimed in claim 1, wherein said polymer has the following composition:
a) 50–98% by weight of at least one alkyl ester of (meth)acrylic acid,
b) 1 to 5% by weight of at least one alkyl polyethoxy (meth)acrylate of formula 1,
c) 0.3–4% by weight of at least one ethylenically unsaturated mono- or dicarboxylic acid,
d) 0–6% by weight of acrylonitrile or methacrylonitrile, and
e) 0–30% by weight of further ethylenically unsaturated compounds selected from the group consisting of divinylbenzene, butanediol diacrylate, ethyldiglycol diacrylate, hexanediol diacrylate, ureidoethyl methacrylate, ureidoethyl methacrylamide, allyl methacrylate, 3-methacryloyloxypropyltrimethoxysilane, acetoacetoxyethyl methacrylate, diacetoneacrylamide, acrylamidoglycolic acid and methyl acrylamidoglycolate methyl ether.

* * * * *